May 2, 1933.  W. H. CAPELL  1,907,342
AIRCRAFT MACHINE GUN INSTALLATION
Filed Oct. 27, 1931  2 Sheets-Sheet 1
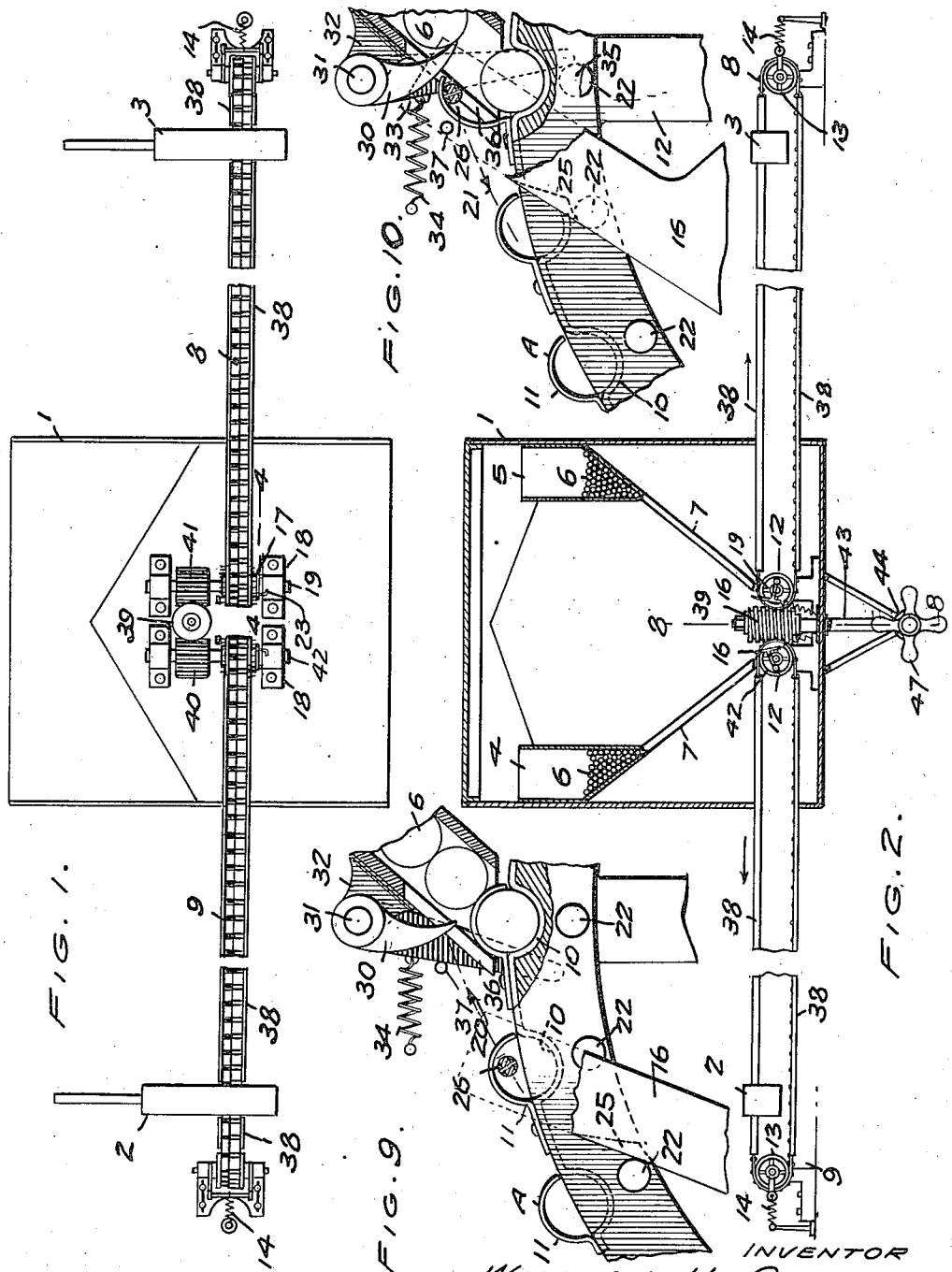
INVENTOR
WILLIAM H. CAPELL
BY Robert H. Young
ATTORNEY

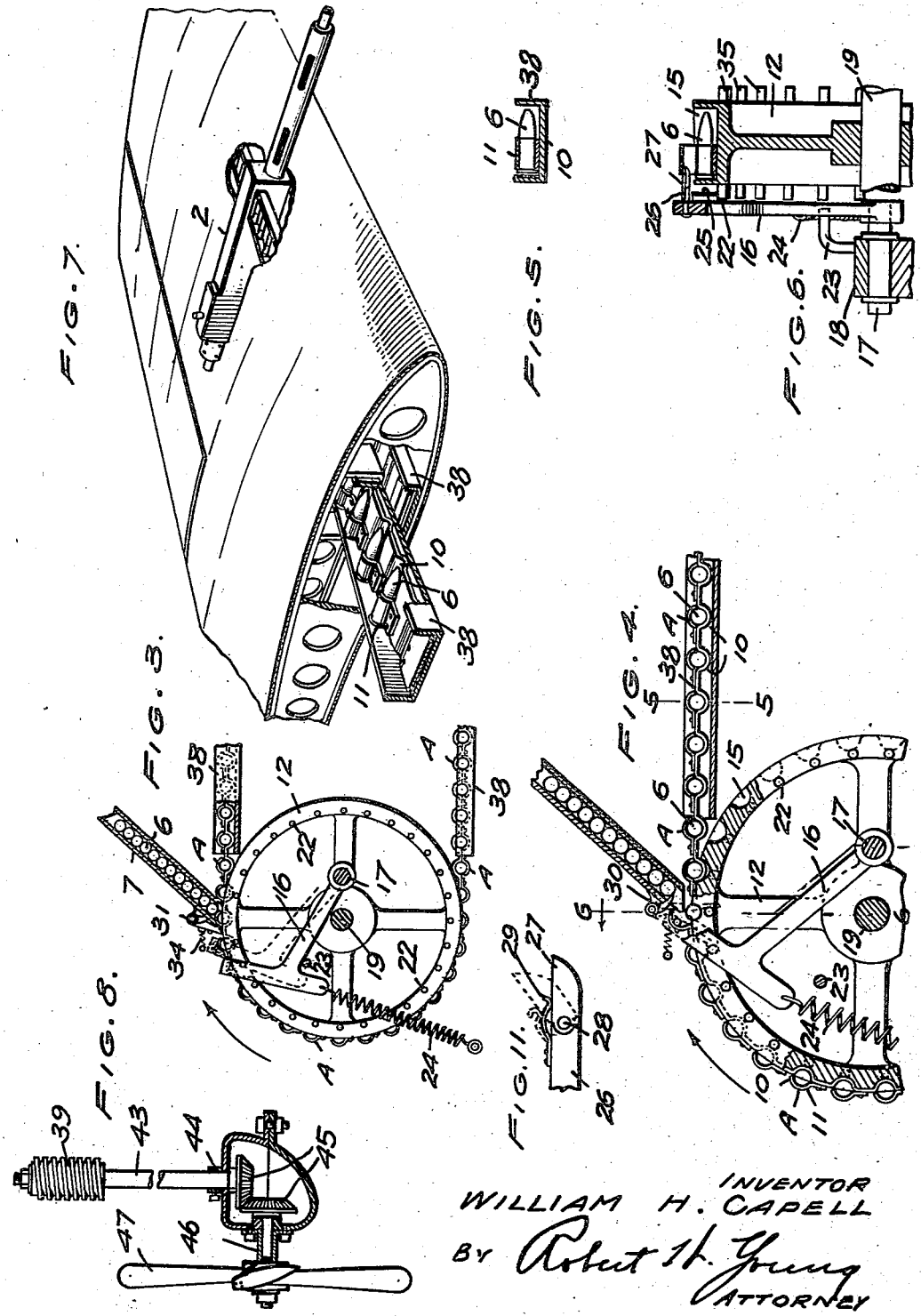

Patented May 2, 1933

1,907,342

UNITED STATES PATENT OFFICE

WILLIAM H. CAPELL, OF HAMPTON, VIRGINIA

AIRCRAFT MACHINE GUN INSTALLATION

Application filed October 27, 1931. Serial No. 571,367.

This invention has reference to improvements in aircraft machine gun installation and especially to a novel device for loading or charging a pair of machine guns from a common source of supply.

The objects of the improvements are: First, to furnish a continuous supply of ammunition from a central reservoir to machine guns mounted in the wings of an airplane; second, to provide means for relieving the strain on the gun mechanism while at the same time maintaining the tension of the cartridge belt; and, third, to provide novel means for feeding the ammunition of the cartridge reservoir on to the ammunition belts.

With the above in view, the invention resides in the construction, arrangement, and combination of parts hereinafter more fully described and explained, with reference to the accompanying drawings, wherein:

Figure 1 is a plan view of the invention;

Figure 2 is an end view thereof, partly in section and partly in elevation;

Figures 3 and 4 are detail views of the hopper-discharging and belt-feeding mechanisms;

Figure 5 is a sectional detail view of a belt guide, taken on line 5—5 of Fig. 4;

Figure 6 is a sectional detail view taken on line 6—6 of Figure 4;

Figure 7 is a detail view of a fragment of a wing structure illustrating the gun mounting;

Figure 8 is a detail view of the auxiliary belt-driving means;

Figures 9 and 10 are detail views on an enlarged scale of the cartridge-feeding means of the hopper unit;

Figure 11 is a detail view of the end of the pusher pin.

In installing the invention on an airplane, a metal hopper 1 is mounted in the fuselage so as to be centrally located with respect to machine guns 2 and 3 mounted, as shown to advantage in Fig. 7, in the wings of the airplane. The hopper is provided with a pair of compartments 4 and 5, into which the cartridges 6 are loosely placed with the bullet end forward. Each compartment has a tapering bottom formed with an inclined discharge chute 7 approximately of the width and thickness of a cartridge and of such length as to support a number of cartridges superimposed one upon another.

Each chute 7 discharges its cartridge one at a time and at regularly timed intervals upon a conveyer belt leading to, and operated in the usual manner by, the machine gun. Each machine gun has its own individual conveyer or ammunition belt, as indicated at 8 and 9 respectively. Since the cartridge conveying mechanisms are alike, a description of one will suffice for both. The belt is of the endless or continuous type formed primarily of flexible fabric material and having cartridge loops A composed in part by trough portions 10 of the belt fabric and in part by spring metal clips 11 associated with the trough portions of the belt and riveted or otherwise secured to the latter, as shown in Figs. 9 and 10. The belt is supported at its inner end by a sprocket wheel 12 and at its outer end, after passing through the machine gun, by an idle tension pulley 13. A spring 14 on the idle pulley 13 keeps the belt under tension. The sprocket wheel 12 has a series of pockets 15 in its periphery to accommodate the cartridge loops A of the belt and the latter after passing over the sprocket wheel carries the cartridges to the loading mechanism of the machine gun where they are loaded in the usual manner.

The cartridge retaining loops A of the ammunition belt are opened to receive a cartridge as they successively pass the discharge end of the hopper-chute 7 by a clip-raising mechanism consisting of a clip raising arm 16 movable on shaft 17 journaled in bearing 18. The shaft 18, is offset horizontally with respect to the wheel shaft 19 so that the free end of the arm 16 has a movement traversing the sprocket in an arc indicated by the arrows 20 and 21 of Figs. 9 and 10 respectively, and by the dotted line structure of Fig. 8. The arm is moved from full to dotted line position and then released, in successive operations, by a plurality of studs 22 on the outer side of the wheel rim. The arm 16 is normally held in an inclined position against the stop 23 by the force of the spring 24, as seen in Fig. 8, and a stud 22 coming in contact with the lug 25 of the arm, during the rotation of the wheel, moves the arm upwardly until the lug clears the stud as shown in Fig. 10. As this movement of the arm occurs, the pusher pin 26 carried by the arm 16 pushes the clip 11 upwardly and opens the loop sufficiently to receive a cartridge dropped from chute 7. The pusher pin is disposed at a right angle to the carrying arm 16 and beneath a clip 11, as shown in Fig. 9. To enable the pin to release itself from one loop and reengage the next loop, the forward end 27 is hingedly mounted at 28 to swing out of the loop to a position laterally of the path of same. A spring 29 tensions the end 27 and normally tends to maintain the same in alignment with the rear portion of the pin. Hence, when the end 27 is opposite the side opening of the next loop during the downward movement of arm 16, the spring forces the end 27 inside the loop and in position for opening the same during the next upward movement of the arm.

The releasing of the cartridge from the chute is accomplished by a releasing mechanism comprising a feed pawl 30 fixed on one end of a shaft 31 mounted in bearings 37 on the side of the chute. Fixed on the other end of the shaft 31 is a depending trip-lever 33 which, when moved against the action of spring 34 by appropriately spaced studs 35 on the inner side of the wheel rim, turns the shaft 31 so as to cause the pawl to engage under the next to the bottom cartridge in the chute and thus to slightly raise and support the entire column of cartridges until withdrawn by the contraction of spring 34 following the passage of the actuating stud 35 beyond the lever 33. This action takes place subsequent to the dropping of the bottom cartridge into the open loop of the moving belt and the closing of the loop about the said cartridge. The lower end of the chute is slotted on one side, as shown at 36 to provide for the entrance and exit of the pawl and the return swing of the trip-lever is limited by a stop-lug 37. The upper and lower runs of the ammunition belts are housed in channel guides 38, which guides extend into the wings of the airplane as shown in Fig. 7.

The machine guns furnish the primary power for operation of the belts and an air screw mechanism furnishes additional power to the sprocket wheels to relieve the strain on the feeding or loading mechanisms of the guns, as well as to keep the slack out of the belts. The air screw mechanism comprises a worm 39 located between and in engagement with worm gears 40 and 41 fixed on the shafts 19 and 42 of the sprocket wheel assemblies of the respective belts 8 and 9. The worm is carried on a vertically disposed shaft 43 depending below the fuselage of the airplane with its lower end suitably supported in a bracket bearing 44. Connected by bevel gears 45 to the lower end of the worm shaft is a horizontally disposed shaft 46 on which is fixed an air screw 47 which by reason of its disposal in the air stream caused by the movement of the airplane through the air, supplies the necessary motive power for rotating the worm shaft and thus turning the sprocket wheels.

From the foregoing description, it will be apparent that the invention provides efficient means for maintaining an adequate and continuous supply of ammunition from a central reservoir to machine guns located at points remote from the source of ammunition supply and the feeding operation is carried out without imposing any undue stresses or strains on the gun mechanism. The structure herein shown and described is illustrative of only one practical application of the invention and it is to be understood that various modifications may be resorted to within the scope of the appended claims.

Having thus described the invention, what is claimed is:

1. In combination with an airplane having machine guns mounted in the wings thereof, a central cartridge reservoir, and means for conveying cartridges from the reservoir to the said guns, said conveying means being operated by the loading mechanism of the guns.

2. In combination with an airplane having machine guns mounted in the wings thereof, a central cartridge reservoir, and means for continuously conveying cartridges from the reservoir to the said guns, said conveying means being operated by the loading mechanisms of the said guns.

3. In combination with an airplane having machine guns mounted in the wings thereof, a cartridge reservoir, means for conveying cartridges from the reservoir to the said guns, said conveying means being actuated by the loading mechanisms of the guns, and additional actuating means supplementing the gun loading mechanisms.

4. In combination with an airplane having machine guns mounted in the wings thereof, a cartridge reservoir, means for conveying cartridges from the reservoir to the loading mechanisms of the guns, said conveying means being actuated by the said gun-loading mechanisms, and a fluid motor operatively connected with the conveying means for supplementing the gun-loading mechanism.

5. In combination with an airplane having machine guns mounted in the wings thereof, a cartridge reservoir having a plurality of cartridge containers, cartridge feeding means leading from each container to a machine gun, each of said cartridge-feeding means being primarily actuated by the gun mechanism, and single drive means common to all the cartridge-feeding means for supplementing the gun-mechanism.

6. An aircraft machine gun loader comprising, in combination with a machine gun mounted in a wing of the aircraft, means primarily operated by the feeding mechanism of the gun for furnishing a continuous supply of ammunition thereto, and auxiliary drive means supplementing the gun feeding mechanism to relieve the strain thereon.

7. An aircraft machine gun loader comprising in combination with a machine gun mounted in a wing of the aircraft, of a cartridge reservoir, a feed belt for conveying cartridges from the reservoir to the gun, said belt being operatively connected with the loading mechanism of the gun for primary actuation thereby, and an air screw operatively connected with the feed belt for supplementing the driving power of the gun mechanism.

8. An aircraft machine gun loader comprising, in combination with an airplane having machine guns mounted in the wings thereof, of a cartridge reservoir, an endless belt between each gun and the reservoir for carrying the cartridges to the loading mechanism of the gun which furnishes the primary power for operation of the belt, means for feeding the cartridges of the reservoir to the said belts, belt-tensioning means at the outer ends of the belts, belt-driving means at the inner ends of the belts supplementing the gun mechanism, and belt guides between the belt tensioning means and the supplementary belt-driving means.

9. A cartridge feeding device comprising a hopper, a machine gun cartridge feeding belt having cartridge-retaining loops each of which includes an outwardly movable clip, means for moving the belt under the hopper, means operated by the belt-moving means for releasing the cartridges successively from the hopper, and automatic means for moving the clips outwardly at timed intervals and thereby opening the said cartridge-retaining loops to receive the released cartridges.

10. In combination with an airplane having machine guns mounted in a wing thereof and on relatively opposite sides of the fuselage, a hopper mounted in the fuselage and centrally located with respect to the machine guns, an individual cartridge-conveyer belt for each machine gun having its receiving or inner end below the hopper, means for feeding the cartridges from the hopper to the said belts, and belt-moving means consisting of a worm gear at the inner end of each belt, a vertically disposed drive shaft, a worm on the upper end of the shaft and common to the worm gears of the said belts, and a fan on the lower end of the shaft and disposed in the air stream of the plane.

11. In a cartridge feeding machine, a hopper, a cartridge belt having closed loops formed in part by trough portions of the belt and in part by spring clips, each of said clips having one end fastened rigidly to the belt and the other end free to be swung outwardly thereof and means for feeding the belt continuously past the hopper and including a clip-raising mechanism for swinging said free ends of the clips outwardly to open the loops to receive cartridges.

12. In a cartridge feeding machine, a cartridge belt having closed loops formed in part by trough portions of the belt and in part by spring clips spanning the said trough portions, and a clip-raising mechanism including a rotatable belt supporting wheel, an inclined arm movable laterally and eccentrically of the wheel and carrying a pin disposed beneath a clip, and studs on the wheel for successively engaging and moving said arm and pin upwardly during rotation of the wheel for raising the clip to open the loop, and means for reengaging the pin with the next succeeding loop.

In testimony whereof I affix my signature.

WILLIAM H. CAPELL.